(12) United States Patent
Voelker et al.

(10) Patent No.: US 12,038,051 B2
(45) Date of Patent: Jul. 16, 2024

(54) COUPLING ASSEMBLY WITH DETENT MECHANISM

(71) Applicant: Means Industries, Inc., Saginaw, MI (US)

(72) Inventors: Brandon J. Voelker, Saginaw, MI (US); Joshua D. Hand, Midland, MI (US); Earl A. Getchel, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/977,307

(22) Filed: Oct. 31, 2022

(65) Prior Publication Data

US 2023/0141381 A1      May 11, 2023

Related U.S. Application Data

(60) Provisional application No. 63/276,880, filed on Nov. 8, 2021.

(51) Int. Cl.
*F16D 41/16*     (2006.01)
*F16D 27/10*     (2006.01)
*F16D 27/108*    (2006.01)
*F16D 41/04*     (2006.01)
*F16D 41/14*     (2006.01)

(52) U.S. Cl.
CPC ........... *F16D 41/16* (2013.01); *F16D 27/108* (2013.01)

(58) Field of Classification Search
CPC ....... F16D 41/12–16; F16D 2023/0618; F16D 27/00–14; F16D 23/00–148; F16D 23/08; F16D 41/04; F16D 27/108; F16D 27/10; F16D 13/60; F16D 13/58
See application file for complete search history.

(56) References Cited

U.S. PATENT DOCUMENTS

| | | | | |
|---|---|---|---|---|
| 2007/0278061 A1* | 12/2007 | Wittkopp | ................ | F16D 41/14 192/43.1 |
| 2007/0289834 A1* | 12/2007 | Razzacki | ................ | F16D 23/06 192/53.3 |
| 2015/0000442 A1* | 1/2015 | Kimes | ................... | F16H 63/304 192/84.1 |

FOREIGN PATENT DOCUMENTS

WO    WO-2004005739 A1 *  1/2004  ............. F16D 23/06

* cited by examiner

*Primary Examiner* — Tinh Dang
(74) *Attorney, Agent, or Firm* — Burgess Law Office, PLLC

(57) ABSTRACT

A coupling assembly includes a multiple-position actuation mechanism and a detent assembly holding the actuation mechanism in a discrete position. The detent assembly may include a mechanical detent. In one example, the mechanical detent engages the actuation mechanism and holds the actuation member in a neutral or middle position.

20 Claims, 4 Drawing Sheets

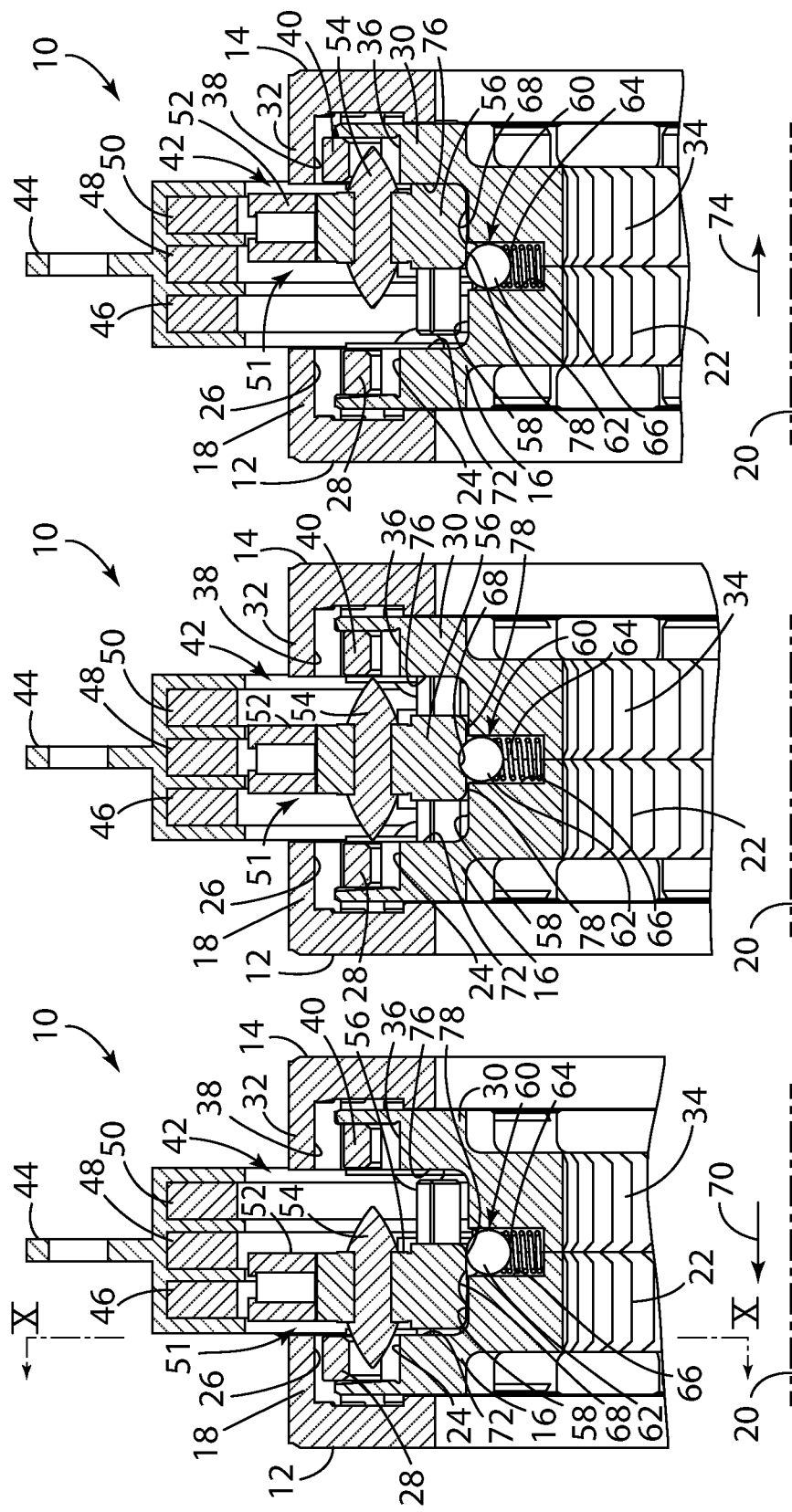

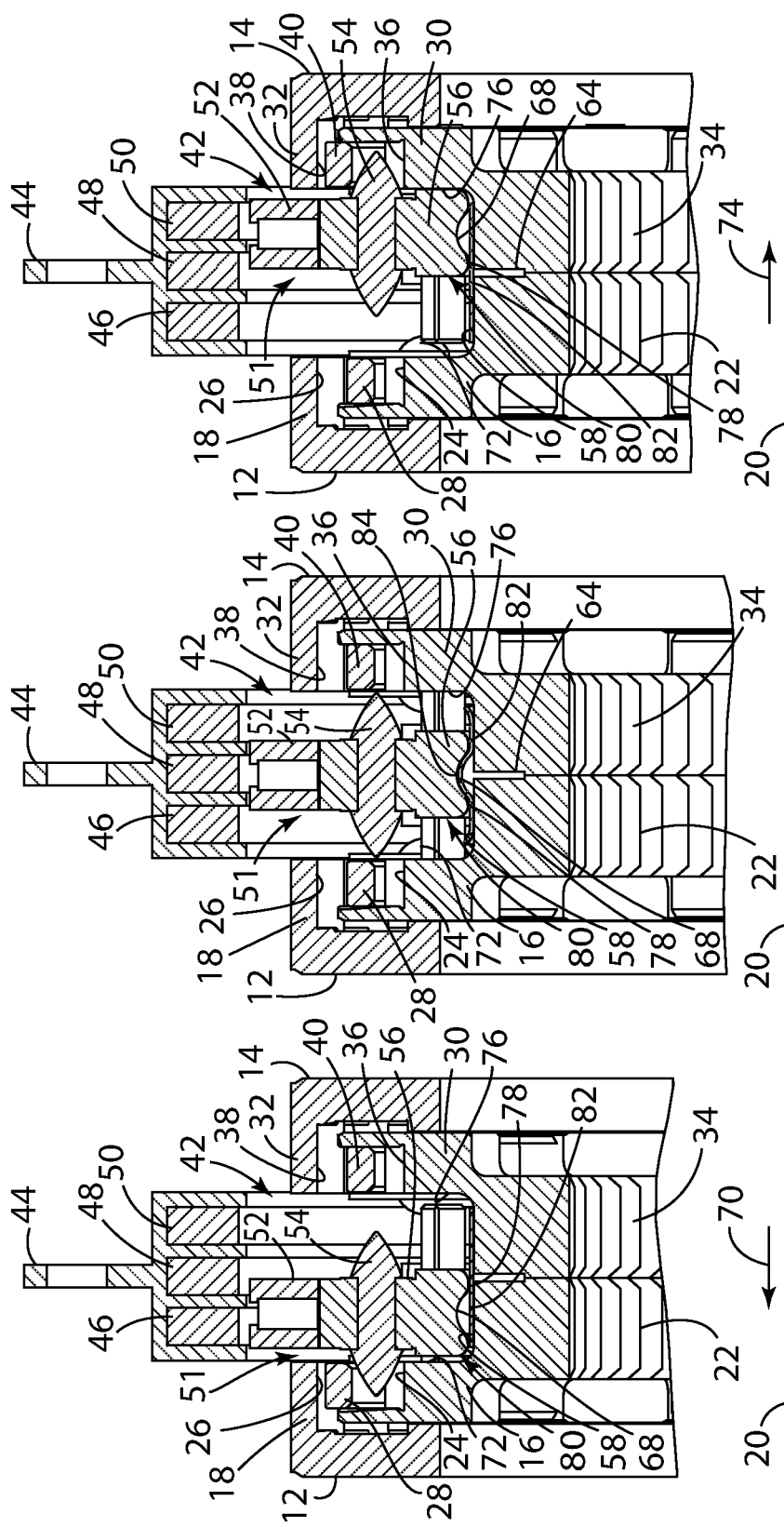

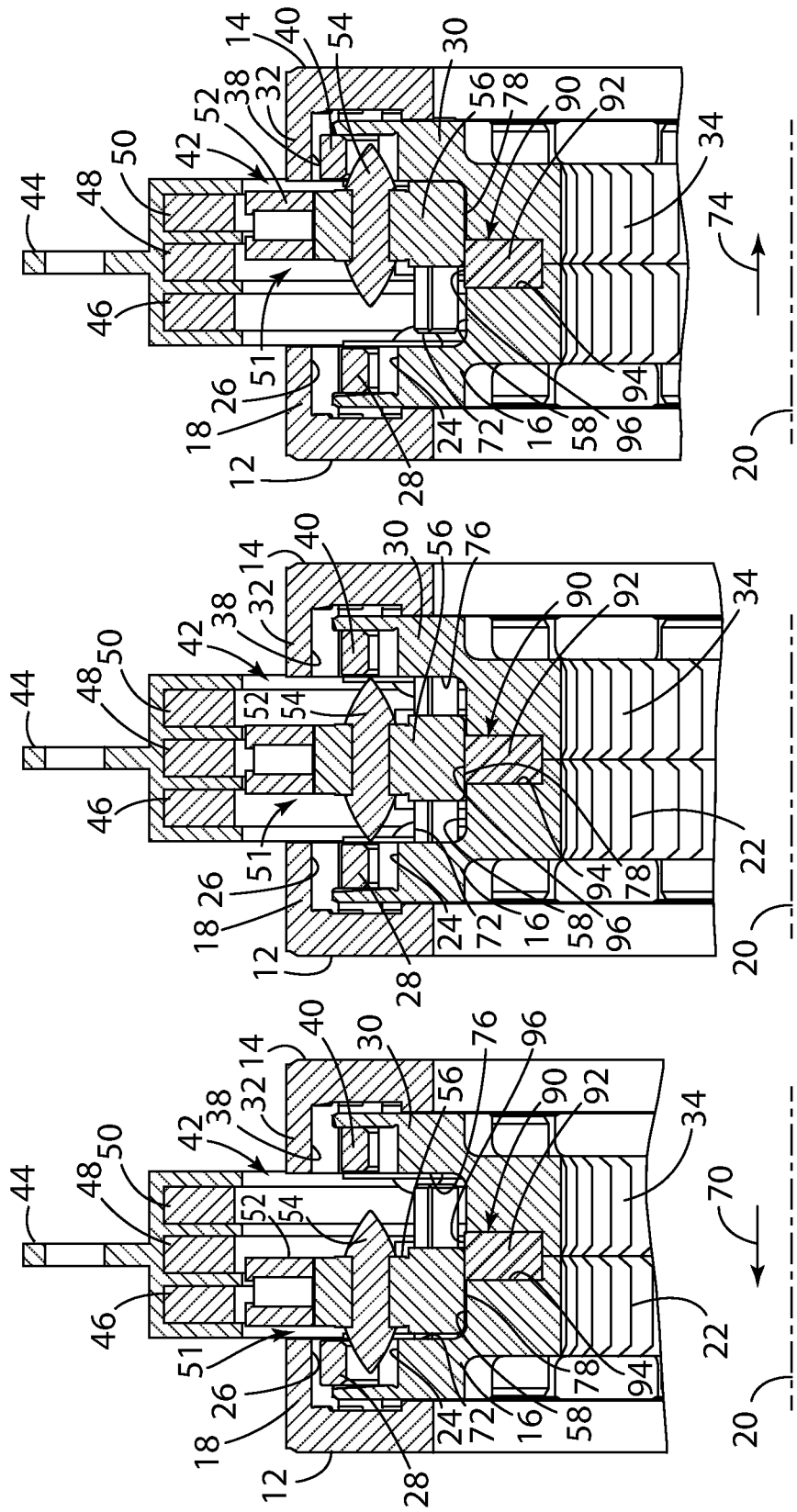

COUPLING ASSEMBLY WITH DETENT MECHANISM

CROSS-REFERENCE TO RELATED APPLICATIONS

This application claims the benefit of U.S. Provisional Application No. 63/276,880, filed Nov. 8, 2021. The disclosure of the above application is incorporated herein by reference.

BACKGROUND OF THE INVENTION

1. Field of the Invention

The invention generally relates to a vehicle power train or drive system; and, more specifically, a system and mechanism for controlling coupling assembly.

2. Description of Related Art

In automotive technology, existing motor vehicle drive trains use coupling assemblies, including controllable or selectable one-way clutches. These coupling assemblies can be electromagnetically operated and magnetically controlled.

SUMMARY OF THE INVENTION

A coupling assembly includes a first coupling mechanism and a second coupling mechanism. The coupling assembly further includes an actuation mechanism with a carriage movable between a first, second, and third position. A detent assembly holds the carriage in one of the first, second, and third positions.

Further areas of applicability of the present invention will become apparent from the detailed description provided hereinafter. It should be understood that the detailed description and specific examples while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-sectional schematic side view of a coupling assembly in accordance with one example of the present invention for coupling components in a first position.

FIG. 2 is a cross-sectional schematic side view of the coupling assembly of FIG. 1 in a second position.

FIG. 3 is a cross-sectional schematic side view of the coupling assembly of FIG. 1 in a third position.

FIG. 4 is a cross-sectional schematic side view of an alternative example of the coupling assembly in a first position.

FIG. 5 is a cross-sectional schematic side view of the coupling assembly of FIG. 4 in a second position.

FIG. 6 is a cross-sectional schematic side view of the coupling assembly of FIG. 4 in a third position.

FIG. 7 is a cross-sectional schematic side view of another alternative example of the coupling assembly in a first position.

FIG. 8 is a cross-sectional schematic side view of the coupling assembly of FIG. 7 in a second position.

FIG. 9 is a cross-sectional schematic side view of the coupling assembly of FIG. 7 in a third position.

DETAILED DESCRIPTION OF THE PREFERRED EMBODIMENTS

Figure 10:
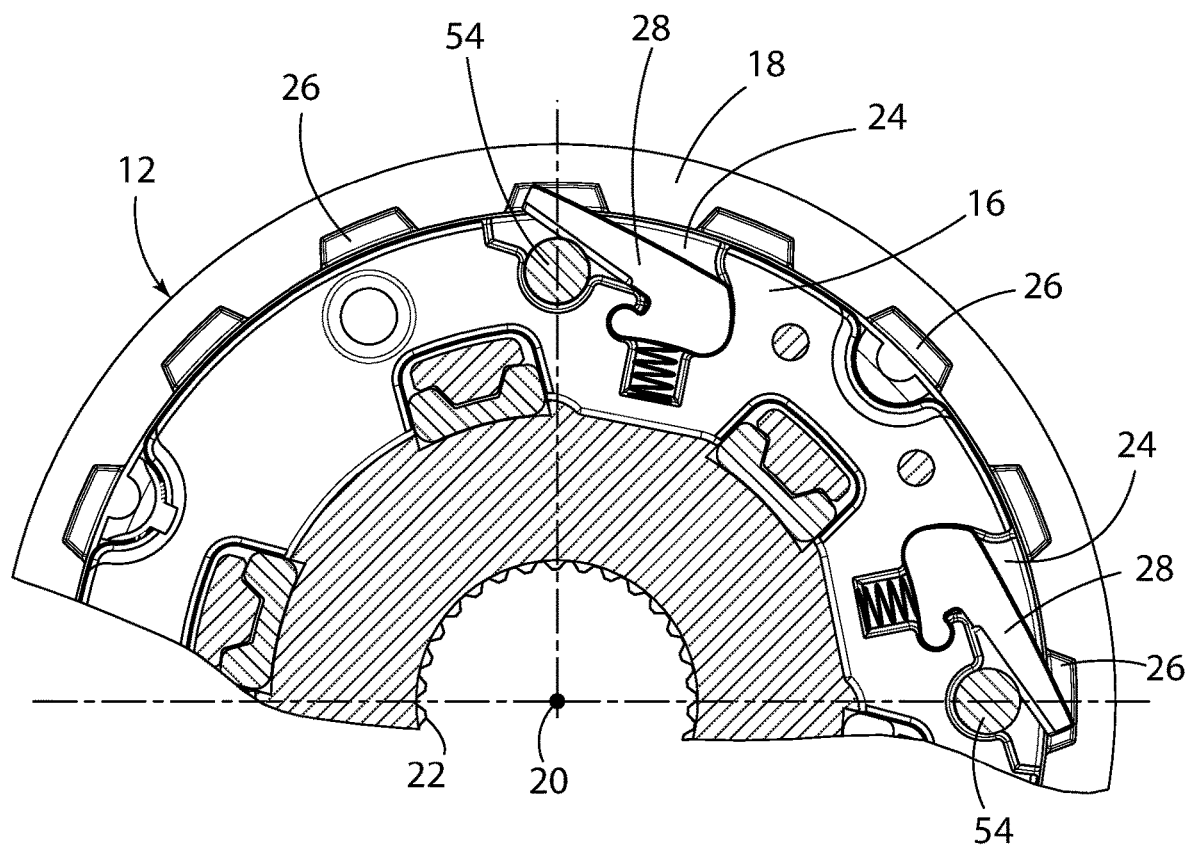
FIG. 10 is a cross-sectional view of the coupling assembly of FIG. 1 taken on lines 10-10.

The following description of the preferred embodiment(s) is merely exemplary in nature and is in no way intended to limit the invention, its application, or its uses.

Examples of the present invention are disclosed herein; however, it is to be understood that the disclosed embodiments are merely exemplary of the invention that may be embodied in various and alternative forms. The figures are not necessarily to scale; some features may be exaggerated or minimized to show details of the components. Therefore, specific structural and functional details disclosed herein are not to be interpreted as limiting but merely as a representative basis for teaching one skilled in the art to variously employ the present invention.

The figures illustrate a coupling device or assembly, generally seen at 10. The coupling device or assembly 10 can be used in place of a traditional dog-clutch/synchronizer in a DCT (dual-clutch transmission), AMT (automated manual transmission), or others.

The coupling device or assembly 10 includes a first coupling mechanism 12 and a second coupling mechanism 14. The first and second coupling members 12, 14 may be selectable one-way clutches. A selectable one way clutch can produce a mechanical connection between rotating or stationary components in one or both directions and can overrun in one or both directions and allows the selection of different modes. A selectable one-way clutch can either be static, one race of the clutch does not rotate, or dynamic, both clutch races can rotate.

FIG. 10 shows an example of the first coupling mechanism 12 as a selectable one-way clutch that includes a pocket plate 16 and a notch plate 18. The pocket plate 16 and notch plate 18 are supported for relative rotation about a common axis 20. The pocket plate 16 includes a shaft or gear connection, illustrated as splines 22. The pocket plate 16 includes a plurality of pockets 24. The notch plate 18 connected to a shaft/gear (not shown) includes a plurality of notches 26. The first coupling mechanism 12 includes a locking member or strut 28 in each pocket 24. When the locking member or strut 28 extends radially outward of the pocket plate 16, it engages the notch 26 on the notch plate 18, coupling the pocket plate 16 to the notch plate 18 and preventing relative rotation between the pocket plate 16 and notch plate 18 in at least one direction.

Similar to the first coupling mechanism 12, the second coupling mechanism 14 is also a selectable one-way clutch that includes a pocket plate 30 and a notch plate 32. Like the pocket plate 16, the pocket plate 30 includes a shaft or gear connection, illustrated as splines 34. The pocket plate 30 and notch plate 32 are supported for relative rotation about the common axis 20. The pocket plate 30 includes a plurality of pockets 36. The notch plate 32, connected to a shaft/gear (not shown), includes a plurality of notches 38. The second coupling mechanism 14, includes a locking member or strut 40 in each pocket 36. When the locking member or strut 40 extends radially outward of the pocket plate 30, it engages the notch 38 on the notch plate 32, coupling the pocket plate 30 and the notch plate 32 and preventing relative rotation between the pocket plate 30 and notch plate 32 in at least one direction.

The preceding description of a coupling device or assembly 10 is one example illustrating the locking member or strut 28, 40 orientation. For example, as shown, when actuated, the struts extend radially in a direction transverse to the direction of the common axis 20. In another example, the locking member or strut 28, 40 may extend axially in the direction of the common axis 20.

An actuation mechanism, generally seen at 42, moves the locking member or strut 28, 40 to an extended position, radially outward of its respective pocket plate 16, 30, as shown in FIG. 10. As illustrated, the actuation mechanism includes a fixed or stationary linear actuator or stator 44. The stator 44 includes three stator coil bays 46, 48, 50. The actuation mechanism 42 further includes a translator assembly 51. The translator assembly 51 includes a linear actuator or translator 52 and a translator plunger 54 supported on a carriage 56. The carriage 56 is supported adjacent to the pocket plates 16, 30 for reciprocal motion in the direction of the longitudinal or common axis 20. In one example, the carriage 56 moves along the outer circumferential surface 58 of the respective pocket plates 16, 30. The disclosed example shows the individual pocket plates 16, 30 sandwiched together, having a common outer circumferential surface 58. The individual pocket plates 16, 30 could be formed as an integral, one-piece unit with a first set of pockets 24 and a second set of pockets 36.

In one example, the actuation mechanism 42 may include a three-position linear actuator movable between a first, second, and third position. Each position may correspond to an operating state or mode. For example, the translator assembly 51 may be placed at a first or left-hand position wherein the translator plunger 54 engages the struts 28 of the pocket plate 16 of the first coupling mechanism 12; a second or middle, which may be referred to as a neutral position, in which the translator plunger 54 is spaced from and located between the first coupling mechanism 12 and the second coupling mechanism 14 wherein the translator plunger does not engage the struts 28, 40 of the respective pocket plates 16, 30; and a third or right-hand position wherein the translator plunger 54 engages the struts 40 of the pocket plate 30 of the second coupling mechanism 14. The disclosure is for illustrative purposes; the operating state or mode of each of the three positions may vary. For example, the second or middle, neutral position need not be a non-engaged, neutral state or mode. Instead, the second or middle, neutral position may be an engaged state or mode.

In another embodiment, any of the three positions can be a non-engaged position. For example, the first position can be a non-engaged state or mode, while the second and third positions are engaged states or modes or some combination thereof. While a non-engaged, neutral position state or mode is disclosed as the second or middle position, the non-engaged, neutral position state or mode can be on the far left or far right and not the middle position.

Following are various examples of a detent mechanism that holds or secures the translator assembly 51 in the middle position regardless of the operating state or mode, irrespective of the use, state, or mode, of the middle position.

FIGS. 1-3 illustrate the position of the translator assembly 51, including the translator 52, translator plunger 54, and carriage 56, and correspondingly, engagement or disengagement between the translator plunger 54 and struts 28, 40. The stator 44 and respective stator coil bays 46, 48, 50 provide magnetic control forces that magnetically bias the translator assembly 51, including the translator 52, translator plunger 54, and carriage 56 into one of three positions.

FIG. 1 illustrates the first position, placing the left-hand clutch or first coupling mechanism 12 in a lock state or mode. The translator assembly 51 is positioned on the left-hand side adjacent to the stator coil bay 46. The translator plunger 54 contacts and urges the strut 28 radially outward into engagement with the notch 26 of the notch plate 18 and coupling the pocket plate 16 to the notch plate 18.

FIG. 2 illustrates the second position, an in-between or middle position, wherein both the left-hand clutch or first coupling mechanism 12 and the right-hand clutch or second coupling mechanism 14 are in an open or unlocked state or mode. The second position, an in-between or middle position, is located between or in the middle of the first and second positions. As shown in FIG. 2, the translator plunger 54, positioned between the left-hand clutch or first coupling mechanism 12 and the right-hand clutch or second coupling mechanism 14 and adjacent to the stator coil bay 48, is spaced from and does not contact the struts 28, 40.

FIG. 3 illustrates the third position, placing the right-hand clutch or second coupling mechanism 14 in a lock state or mode. The translator assembly 51 is positioned on the right-hand side adjacent to the stator coil bay 50. The translator plunger 54 contacts and urges the strut 40 radially outward into engagement with the notch 38 of the notch plate 32 and coupling the pocket plate 30 to the notch plate 32.

Energizing a particular stator coil bay 46, 48, 50 of the stator 44 moves the carriage 56 to one of the first, second, and third positions. Upon actuation/energizing the stator 44, the translator assembly 51 tends to overshoot when traveling from the left side, or first coupling mechanism 12, the first position, or from the right side, or second coupling mechanism 14, third position, to the second position, the in-between or middle position. This may create a non-synchronous engagement on the other outside or opposite position if the overshoot causes the translator assembly 51 to extend too far past the middle position.

FIGS. 1-3 illustrate one example of the detent mechanism. The detent mechanism includes a mechanical detent assembly 60. The mechanical detent assembly 60 includes a detent ball 62 biased radially outwardly by a spring 64. The spring 64 and detent ball 62 cooperate to form a spring-loaded ball located in a bore 66. The bore 66 extends radially inward from the outer circumferential surface 58 of the respective pocket plates 16, 30. The carriage 56 includes a detent recess 68 having a semispherical/concave shape. FIG. 2 shows the translator assembly 51, including the translator 52, translator plunger 54, and carriage 56 in the second or middle, neutral position, wherein the spring 64 pushes detent ball 62 into the detent recess 68, which holds the carriage 56 stationary. FIG. 1 illustrates the translator assembly 51 in the first position—left-hand clutch/first coupling mechanism 12 in lock state. In the first position, the translator plunger 54 engages the struts 28. To move the carriage 56 left, in the direction of the arrow 70, the stator 44, through stator coil bay 46, generates an axial force in the direction of the arrow 70, sufficient to overcome the radial detent force generated by the spring 64 and detent ball 62 on the carriage 56. When the axial force reaches a predetermined level, the semispherical/concave shape of the detent recess 68 acts as a cam surface and pushes the detent ball 62 inwardly, compressing the spring 64 whereby the carriage 56 continues to move to the left until it reaches a stop surface 72 on the pocket plate 16 with the detent ball 62 engaging an inner circumferential surface 78 of the carriage 56.

As the stator 44 and stator coil bay 48 operate to return the translator assembly 51, including the translator 52, translator plunger 54, and carriage 56 from the first position or left-hand positon shown in FIG. 1 to the second or middle, neutral position shown in FIG. 2, the detent ball 62 reengages the detent recess 68 to catch and hold the carriage 56 in the second or middle, neutral position.

FIG. 3 illustrates the translator assembly 51 in the third position—right-hand clutch or second coupling mechanism 14 in lock state. In the third position, the translator plunger 54 engages the struts 40. To move the carriage 56 right, in the direction of the arrow 74, the stator 44, through stator coil bay 46, generates an axial force in the direction of the arrow 74, sufficient to overcome the radial detent force generated by the spring 64 and detent ball 62 on the carriage 56. As shown in FIG. 4, when the axial force reaches a predetermined level, the semispherical/concave shape of the detent recess 68 acts as a cam surface and pushes the detent ball 62 inwardly, compressing the spring 64, whereby the carriage 56 continues to move to the right until it reaches a stop surface 76 on the pocket plate 30.

As the stator 44 and stator coil bay 48 operate to return the translator assembly 51, including the translator 52, translator plunger 54, and carriage 56 form the third or right-hand position shown in FIG. 3 to the second or middle, neutral position shown in FIG. 2, the detent ball 62 reengages the detent recess 68 to catch and hold the carriage 56 in the second or middle, neutral position.

FIGS. 4-6 illustrate a second example of a detent mechanism. The detent mechanism includes a mechanical detent assembly 80, including a wave spring 82 having a radially outwardly extending crest 84. The wave spring 82 rests on the respective outer circumferential surface 58 of the pocket plates 16, 30, wherein the crest 84 engages the semispherical or concave detent recess 68. FIG. 5 shows the translator assembly 51, including the translator 52, translator plunger 54, and carriage 56 in the second or middle, neutral position with the crest 84 of the wave spring 82 in the detent recess 68 and holding the carriage 56 stationary. FIG. 4 illustrates the translator assembly 51 in the first or left-hand position—left-hand clutch/first coupling mechanism 12 in lock state. In the first position, the translator plunger 54 engages the struts 28. To move the carriage 56 left, in the direction of the arrow 70, the stator 44, through stator coil bay 46, generates an axial force in the direction of arrow 70, sufficient to overcome the radial detent force generated by the wave spring 82 on the carriage 56. When the axial force reaches a predetermined level, the semispherical/concave shape of the detent recess 68 and the crest 84 of the wave spring 82 act as cam surfaces, pushing the crest 84 of the wave spring 82 inwardly, flattening the wave spring 82 whereby the carriage 56 continues to move to the left until it reaches a stop surface 72 on the pocket plate 16.

As the stator 44 and stator coil bay 48 operate to return the translator assembly 51, including the translator 52, translator plunger 54, and carriage 56 from the first or left-hand position shown in FIG. 4 to the second or middle, neutral position shown in FIG. 5, the crest 84 of the wave spring 82 engages the detent recess 68 to catch and hold the carriage 56 in the second or middle, neutral position.

When moving the translator assembly to the right, in the direction of the arrow 74, the axial force in the direction of the arrow 74 overcomes the radial detent force generated by the wave spring 82 on the carriage 56, flattening the wave spring 82, whereby the carriage moves to the right until it reaches the stop surface 76 on the pocket plate 30.

As the stator 44 and stator coil bay 48 operate to return the translator assembly 51, including the translator 52, translator plunger 54, and carriage 56 from the third or right-hand position shown in FIG. 6 to the second or middle, neutral position shown in FIG. 5, the crest 84 of the wave spring 82 engages the detent recess 68 to catch and hold the carriage 56 in the second or middle, neutral position.

FIGS. 7-9 illustrate a third example of a detent mechanism. The detent mechanism includes a mechanical detent assembly 90. The mechanical detent assembly includes a friction member 92 in a bore 94. As illustrated, the friction member 92 extends outwardly above the radial or circumferential surface 58 of the first and second pocket plates 16, 30. FIG. 8 shows the translator assembly 51, including the translator 52, translator plunger 54, and carriage 56 in the second or neutral position wherein the entire radial or contact surface 96 of the friction member 92 contacts the carriage 56 and holds the carriage 56 stationary. FIG. 7 illustrates the translator assembly 51 in the first position—left-hand clutch/first coupling mechanism 12 in lock state. In the first position, the translator plunger 54 engages the struts 28. To move the carriage 56 left, in the direction of the arrow 70, the stator 44, through stator coil bay 46, generates an axial force in the direction of arrow 70, sufficient to overcome the frictional force generated by the friction member 92 on the carriage 56. Depending upon the dimensions/size/surface area of the radial or contact surface 96 of the friction member 92 contacting the carriage 56, the carriage 56 may clear, or be spaced from, the friction member 92. When the axial force reaches a predetermined level and overcomes the frictional force generated by the friction member 92 on the carriage 56, the carriage 56 continues to move to the left until it reaches a stop surface 72 on the pocket plate 16.

As the stator 44 and stator coil bay 48 returns the translator assembly 51, including the translator 52, translator plunger 54, and carriage 56 from the first or right-hand position shown in FIG. 7 to the second or middle, neutral position shown in FIG. 8, the friction member 92 operates to hold the carriage 56 in the second or middle, neutral position.

FIG. 9 illustrates the translator assembly 51 in the third position—right-hand clutch/first coupling mechanism 12 in lock state. In the third position, the translator plunger 54 engages the struts 40. To move the carriage 56 right, in the direction of the arrow 74, the stator 44, through stator coil bay 50, generates an axial force in the direction of arrow 74, sufficient to overcome the frictional force generated by the friction member 92 on the carriage 56. Depending upon the dimensions/size/surface area of the radial or contact surface 96 of the friction member 92 contacting the carriage 56, the carriage 56 may clear, or be spaced from, the friction member 92. When the axial force reaches a predetermined level and overcomes the frictional force generated by the friction member 92 on the carriage 56, the carriage 56 continues to move to the right until it reaches a stop surface 76 on the pocket plate 30.

As the stator 44 and stator coil bay 48 returns the translator assembly 51, including the translator 52, translator plunger 54, and carriage 56 from the third or right-hand position shown in FIG. 9 to the second or middle, neutral position shown in FIG. 8, the friction member 92 operates to hold the carriage 56 in the second or middle, neutral position.

In a further example, a spring located in the bore 94 may urge the friction member 92 radially outward and increase the frictional force generated on the carriage 56. In addition, the material of the friction member, for example, a plastic material, may vary to vary the frictional force generated. The size or surface area of the radial or contact surface 96 of the frictional member 92 engaging the carriage 56 also varies the frictional force. In a further embodiment, the frictional member 92 could be a brush or other member that acts on the carriage 56 to control the movement of the carriage 56 and, correspondingly, the translator assembly 51.

Further embodiments may include springs, tension or compression springs attached to the translator assembly 51, or one or more of the translator 52, translator plunger 54, and carriage 56 to control movement relative to the respective pocket plates 16, 30.

The detent feature of the foregoing embodiments reduces overshoot of the translator assembly 51 when the translator 52, translator plunger 54, and carriage 56 move from the first position to the second or middle position—neutral position. The detent mechanisms keep the translator assembly 51 from over traveling—traveling past the in-between or middle position and potentially engaging the second coupling mechanism 14 when disengaging the first coupling mechanism 12. For example, the detent mechanism prevents overshoot whereby the translator plunger 54 could potentially engage struts 40 of the pocket plate 30 of the second coupling mechanism 14 when the actuation mechanism 42 operates to disengage or move the translator assembly from the first position to the second position.

While the foregoing explains the detent mechanisms used when disengaging the first coupling mechanism 12, moving from the first position to the second position—in between or middle position, the same applies when disengaging the second coupling mechanism 14, moving from the third position to the second position—in between or middle position.

A mechanical detent, for example, a location of higher friction in the middle of the travel, a solid bump detent that slows down the translator, brushes that slow down the translator, or wave springs to provide a detent feature. The mechanical detent may eliminate the potential of a 3-position linear actuator from overshooting when moving from an end position to the middle position. A linear actuator could be used where standard synchronizers are used today in vehicle transmissions, where the outside positions are locked states, and the middle position is an unlocked state.

Each of the first, second, and third positions of the linear actuator, positions of the translator assembly 51, may be associated with different operating states or modes of the clutch assembly. For example, none of the three positions need to position the translator in a neutral or non-engaged state or mode. In addition, the neutral or non-engaged state or mode may be associated with the far left, first position, or the far right, third position, and not the middle, second position.

As set forth herein, the actuation mechanism 42 includes a mechanical detent assembly 60 that holds the translator assembly 51 in a predetermined position associated with different operating states or modes.

While examples or exemplary embodiments are described above, these embodiments are not intended to describe all possible forms of the present invention. The words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary in nature; thus, variations that do not depart from the gist of the invention are intended to be within the scope of the invention.

What is claimed is:

1. A coupling assembly comprising:
a first coupling mechanism;
a second coupling mechanism;
an actuation mechanism including a carriage movable between a first position, a second position, and a third position, the carriage having a longitudinally extending uninterrupted inner circumferential surface extending from one end of the carriage to an opposite end of the carriage; and
a detent assembly, the detent assembly including a detent member, the detent member engages the longitudinally extending uninterrupted inner circumferential surface at the second position.

2. The coupling assembly of claim 1, wherein the second position is located between the first and third positions.

3. The coupling assembly of claim 1, wherein the detent assembly is a mechanical detent assembly.

4. The coupling assembly of claim 3, wherein the mechanical detent assembly includes a spring-loaded ball.

5. The coupling assembly of claim 3, wherein the mechanical detent assembly includes a wave spring.

6. The coupling assembly of claim 3, wherein the mechanical detent assembly includes a friction member.

7. A coupling assembly comprising:
a first pocket plate, a first notch plate, and a first locking member;
a second pocket plate, a second notch plate, and a second locking member;
an actuation member movable between a first position wherein the actuation member engages the first locking member, coupling the first pocket plate to the first notch plate, a second position wherein the actuation member does not engage the first locking member and does not engage the second locking member, and a third position wherein the actuation member engages the second locking member, coupling the second pocket plate to the second notch plate; and
a detent assembly, the detent assembly including a detent member, the detent member engages the actuation member such that a frictional force exists between the detent member and the actuation member wherein any frictional force between the detent member and the actuation member at the first position is less than the frictional force between the detent member and the actuation member at the second position and any frictional force between the detent member and the actuation member at the third position is less than the frictional force between the detent member and the actuation member at the second position.

8. The coupling assembly of claim 7, wherein the detent assembly is mechanical.

9. The coupling assembly of claim 8, wherein the detent assembly includes a spring-loaded ball.

10. The coupling assembly of claim 8, wherein the detent assembly includes a wave spring.

11. The coupling assembly of claim 8, wherein the detent assembly includes a friction member.

12. A coupling assembly comprising:
a first coupling mechanism;
a second coupling mechanism;
a translator assembly including a linear actuator, a carriage, and a translator plunger supported on the carriage, the carriage supported for reciprocal motion between the first coupling mechanism and the second coupling mechanism; and a detent assembly, the detent assembly including a detent member engaging the carriage whereby the detent member generates a constant frictional force on the carriage during reciprocal motion of the carriage between the first coupling mechanism and the second coupling mechanism.

13. The coupling assembly of claim 12, wherein the detent assembly is mechanical.

14. The coupling assembly of claim 13, wherein the detent assembly includes a spring-loaded ball.

15. The coupling assembly of claim 13, wherein the detent assembly includes a wave spring.

16. The coupling assembly of claim 13, wherein the detent assembly includes a friction member.

17. The coupling assembly of claim 1, including:
a stator having multiple coil bays; and
a magnetically biased translator connected to the carriage, the stator acts on the translator to position the carriage in one of the first position, the second position, and the third position.

18. The coupling assembly of claim 1, wherein a frictional force between the detent member and the longitudinally extending uninterrupted inner circumferential surface is greater at the second position than at the first and third positions.

19. The coupling assembly of claim 1, wherein the detent member engages the longitudinally extending uninterrupted inner circumferential surface at each of the first, second, and third positions.

20. The coupling assembly of claim 7, wherein the detent member is spaced from the actuation member in the first and third positions such that there is no frictional force between the detent member and the actuation member at the first and third positions.

* * * * *